United States Patent

Taylor

[11] 4,246,933
[45] Jan. 27, 1981

[54] EXHAUST-INDICATOR

[76] Inventor: Joseph W. Taylor, P.O. Box 40509, Houston, Tex. 77040

[21] Appl. No.: 971,797

[22] Filed: Dec. 21, 1978

[51] Int. Cl.³ .................... F16K 37/00; F15B 13/042; G01L 19/12
[52] U.S. Cl. ................................ 137/552; 137/596.2; 137/557; 116/272
[58] Field of Search ................. 137/552, 557, 596.2, 137/553, 625.6; 91/447, 448, 518, 526; 116/272, 277

[56] References Cited

U.S. PATENT DOCUMENTS

| 1,420,110 | 6/1922 | Kligge | 116/272 |
|---|---|---|---|
| 2,333,188 | 11/1943 | Loughin | 116/272 |
| 3,474,906 | 10/1969 | Tennis | 137/557 |
| 3,641,879 | 2/1972 | Week et al. | 91/526 |
| 3,788,401 | 1/1974 | Scheidt et al. | 91/447 |
| 3,795,177 | 3/1974 | Cryder et al. | 91/518 |
| 3,844,310 | 10/1974 | Brindisi | 137/557 |
| 3,921,660 | 11/1975 | Kowalski | 137/625.64 |
| 3,921,665 | 11/1975 | Lebzelter | 137/557 |
| 4,024,712 | 5/1977 | Takeuchi | 137/557 |
| 4,121,165 | 10/1978 | Bergeron | 137/557 |
| 4,194,529 | 3/1980 | Hargraves et al. | 137/557 |

FOREIGN PATENT DOCUMENTS 2134449  1/1973  Fed. Rep. of Germany ........... 137/557

Primary Examiner—Martin P. Schwadron
Assistant Examiner—A. Michael Chambers
Attorney, Agent, or Firm—Robert W. B. Dickerson

[57] ABSTRACT

A valve device adapted to be fitted to an exhaust opening, said device comprising an apertured housing accomodating a slidable valve body. On exhaust pressure exerting sufficient force against said valve body, the exhaust fluid may exit through said apertures and concurrently cause emission of a signal, indicating exhaust.

7 Claims, 6 Drawing Figures

EXHAUST-INDICATOR

BACKGROUND OF THE INVENTION

In numerous areas of industrial activity, fluid is caused to be exhausted or vented on the occurrence of a selected sequence of events. As an example, in the oil and gas producing industry, many combinations of valves, valve actuators, pilots and other safety devices are utilized to control the flow of through-put, particularly to stop such flow in the event of a dangerous condition. On the occurrence of such an event, such as excessively high or low line pressure, pressurized fluid used to keep the valve open is oftentimes exhausted or vented to remove the necessary pressure, thereby resulting in valve closure. Many times a series of pilots or other controls are used to check on a number of variables. When deviation from the accepted norm occurs, and the valve is closed, it has proved difficult and time consuming to determine, in such situations, which control device, and thereby what problem, triggered closure. This invention was designed to readily provide such information, and utilizes exhaust fluid in a manner heretofore not so used.

SUMMARY OF THE INVENTION

A cylindrical fitting is adapted to be positioned in an exhaust or vent opening of another member. An elongated rod slides within an axial bore of the fitting. Lateral openings communicating with said bore may be yieldably closed by a yieldable member. As the rod slides past such openings, exhaust materials may exit through said openings.

DESCRIPTION OF THE DRAWINGS

FIG. 3 is an axial section through the indicator while

DESCRIPTION OF A PREFERRED EMBODIMENT

Figure 6:
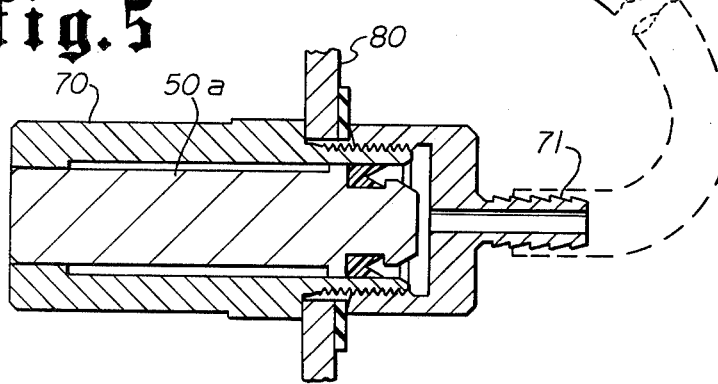
FIG. 6 generally represents presently used controls, with which this invention may be used.
Figure 6:
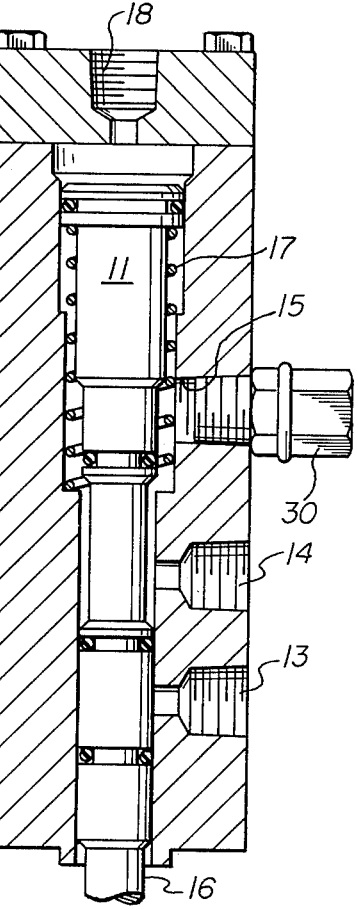

Looking first at FIG. 6, a generalized control device 10 is illustrated which includes a valve member 11 slidable within the bore of housing 12. The housing has actuator fluid inlet 13, actuator fluid outlet 14 and vent or exhaust 15, all communicating with said bore. Line (not shown) pressure being examined would be communicated to line pressure inlet 18. Spring 17 would bias valve member 11 toward its upper position. If line pressure is within the tolerance range communication will be established between inlet 13 and outlet 14, allowing actuator pressure to retain a line valve (not shown) open. If line pressure falls below the tolerance range, valve 11 will be forced to the position shown in FIG. 6, with the illustrated O-rings blocking communication between inlet 13, 14 and opening communication between outlet 14 and exhaust 15, venting the actuator fluid.

Now consider this invention, as particularly shown in FIGS. 1–4. Such device may be threaded into, for example, the exhaust opening 15 of FIG. 6. This invention includes a housing 30 having a threaded nipple extension 31, and a nut portion 32. Such housing further includes an axial bore 33, radial shoulder-forming lug 34, reduced bore portion 35 and end lip 36. Positioned between lug 34 and lip 36 is seal 38. Approximately axially central of said housing, a plurality of radial apertures 41 communicate between bore 33 and the housing exterior. O-ring 42, or like device is shown positioned within annular depression 43 into which depression open one end of said apertures 41. This ring 42 yieldingly blocks fluid passage through apertures 41.

Axially movable within bore 33 is valve body 50. Said valve includes, moving axially from right to left in FIG. 3, stem 51, piston 52, nipple 53 and lip 54. Carried between said nipple and lip is dynamic seal 55.

The operation of the device previously described is as follows. Nipple extension 31 would be fitted or threaded into another device's exhaust aperture, such as outlet 15 of FIG. 6. When such device is operating normally, no fluid under pressure would be exhausted through such outlet. Thus, valve 50 would remain in the position shown by FIGS. 1 and 3. On a critical event occurring, such as the build up of excessive line pressure, communication would be established between outlets 14, 15, exhausting actuator fluid for example. Fluid under pressure would enter bore 33, moving valve 50 axially to the right in FIG. 3, until valve piston 52 abuts shoulder 34. Such movement opens one end of apertures 41. If such pressure is sufficient, member 42 would be raised sufficiently to permit such exhaust fluid to vent. Thus ring 42 serves two purposes. First it requires there be sufficient pressure to permit venting. Second, it prevents contamination of the valve bores and especially of the apertures 41. Not only does valve body 50 permit venting, but when moved to the right, stem 51 becomes exposed, thus providing a visual indication of a malfunction. It should be obvious that movement of stem 51 may actuate further control mechanism, such as an electrical switch.

Figure 1:
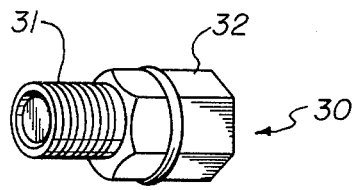
FIGS. 1 and 2 are perspectives of the fitting, FIG. 1 showing the indicator withdrawn and FIG. 2 showing it extended.
Figure 2:
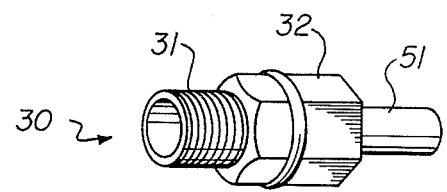
Figure 3:
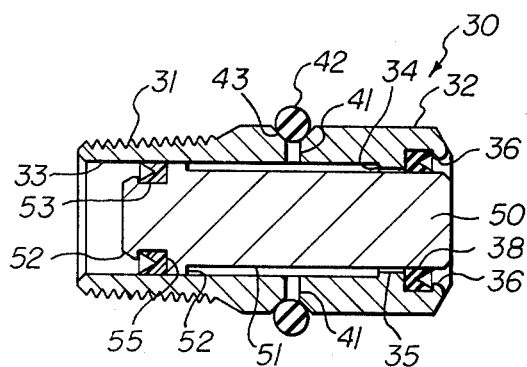
Figure 4:
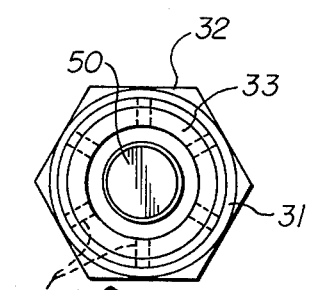
FIG. 4 is an end view thereof.
Figure 5:
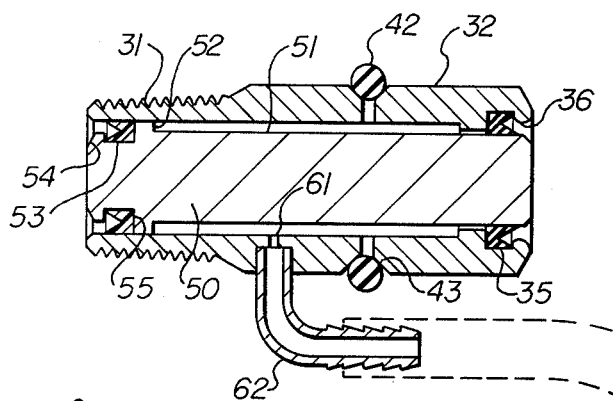
FIG. 5 depicts an embodiment permitting remote usage.

In the modification of FIG. 5, a further radial aperture 61 establishes fluid communication between bore 33 and conduit 62. Such conduit leads to bored nipple 71 of cylinder 70, such cylinder being mounted on panel 80, in a remote location. With the exception of the absence of apertures 41 and ring 42, the remainder of cylinder 70 resembles that of housing 30. In operation, on the occurrence of sufficient exhaust pressure in bore 33, valve 50 would expose outlet 61, permitting exhaust fluid to enter the bore of nipple 71, moving valve-indicator 50a so as to provide a control panel indication of a pilot malfunction, or a relay function.

Although limited embodiments have been illustrated, it should be obvious that numerous modifications would be possible to one skilled in the art without departing from the spirit of the invention, the scope of which is limited only by the following claims.

I claim:

1. A device for utilizing exhaust fluid from a fluid control member, wherein said control member includes an inlet for monitored fluid, an inlet for actuator fluid, an outlet for actuator fluid, an exhaust for actuator fluid and a slide valve member for selectively establishing communication between either said actuator fluid inlet and outlet or between said actuator fluid outlet and said exhaust as a function of said monitored fluid's pressure in said inlet, said device comprising:

a cylindrical housing having an axial bore therethrough and having means at one end for removably fitting said device to said exhaust of said control member;

combination valve and indicator means including a valving portion slidable within said device's bore between a first position, blocking exhaust fluid communication between said control member exhaust and laterally extending aperture means in said housing, and a second position, permitting communication between said control member exhaust and said aperture means in said device housing, said combination valve and indicator means including an indicator portion extending at least partially outside said device housing when said combination valve and indicator means is in said second position wherein said indicator portion extends outside said housing prior to exhaust of said fluid through said aperture means; and said laterally extending aperture means in said device housing in fluid communicating relationship to said control member exhaust outlet only when said combination valve and actuator means is in said second position and not so communicating with said fluid when said combination valve and indicator means is in said first position.

2. The device of claim 1 and including annular yieldable means for yieldably controlling passage of said fluid through said aperture means when said combination valve and indicator means is in said second position.

3. The device of claim 2 wherein said aperture means includes a plurality of radial apertures communicating with said bore.

4. The device of claim 3 wherein said yieldable means comprises a resilient ring.

5. The device of claim 1 wherein said aperture means includes a plurality of radial apertures communicating with said bore.

6. The device of claim 1 and including fluid conduit means communicating with said bore intermediate said housing's one end and said aperture means, to a control panel cylinder, said control panel cylinder slidably carrying a piston member therein, wherein said valving portion slides past said conduit means downward said second position, fluid passes through said conduit means into said cylinder to move said piston member.

7. The device of claim 6 wherein said piston member carries an indicator piston member.

* * * * *